US012154279B2

(12) United States Patent
Misu et al.

(10) Patent No.: US 12,154,279 B2
(45) Date of Patent: Nov. 26, 2024

(54) SYSTEM AND METHOD FOR LEARNING TEMPORALLY CONSISTENT VIDEO SYNTHESIS USING FAKE OPTICAL FLOW (71) Applicant: Honda Motor Co., Ltd., Tokyo (JP)

(72) Inventors: Teruhisa Misu, Mountain View, CA (US); Kumar Akash, Milpitas, CA (US); Kaihong Wang, Allston, MA (US)

(73) Assignee: HONDA MOTOR CO., LTD., Tokyo (JP)

(*) Notice: Subject to any disclaimer, the term of this patent is extended or adjusted under 35 U.S.C. 154(b) by 458 days.

(21) Appl. No.: 17/500,176

(22) Filed: Oct. 13, 2021

(65) Prior Publication Data
US 2022/0383509 A1 Dec. 1, 2022

Related U.S. Application Data (60) Provisional application No. 63/191,710, filed on May 21, 2021.

(51) Int. Cl.
G06T 7/215 (2017.01)
G06F 18/214 (2023.01)
G06N 3/088 (2023.01)

(52) U.S. Cl.
CPC ............ *G06T 7/215* (2017.01); *G06F 18/214* (2023.01); *G06N 3/088* (2013.01); *G06T 2207/20081* (2013.01); *G06T 2207/20084* (2013.01); *G06T 2207/30252* (2013.01)

(58) Field of Classification Search
CPC ........... G06T 7/215; G06T 2207/20081; G06T 2207/20084; G06T 2207/30252; G06T 7/269; G06F 18/214; G06N 3/088; G06N 3/0442; G06V 10/82; G06V 20/58; G06V 10/774
See application file for complete search history.

(56) References Cited

U.S. PATENT DOCUMENTS

2016/0301848 A1* 10/2016 Taggart ................... G06T 5/40
2019/0266409 A1* 8/2019 He ....................... G06V 20/46

OTHER PUBLICATIONS

Unsupervised V2V Translation, Bashkirova et al, 2018; https://arxiv.org/pdf/1806.03698.pdf (Year: 2018).*
Cycada, Hoffman et al, 2017; https://arxiv.org/pdf/1711.03213.pdf (Year: 2017).*
Preserving Semantic and Temporal Consistency, Park et al, 2019; https://arxiv.org/pdf/1908.07683.pdf (Year: 2019).*

(Continued)

*Primary Examiner* — Jianxun Yang
(74) *Attorney, Agent, or Firm* — RANKIN, HILL & CLARK LLP (57) ABSTRACT A system and method for learning temporally consistent video synthesis using fake optical flow that include receiving data associated with a source video and a target video. The system and method also include processing image-to-image translation across domains of the source video and the target video and processing a synthesized temporally consistent video based on the image-to-image translation. The system and method further include training a neural network with data that is based on synthesizing of the source video and the target video.

18 Claims, 6 Drawing Sheets (56) References Cited

OTHER PUBLICATIONS

Baek, K.; Choi, Y.; Uh, Y.; Yoo, J.; and Shim, H. 2020. Rethinking the Truly Unsupervised Image-to-Image Translation. arXiv preprint arXiv:2006.06500.
Bansal, A.; Ma, S.; Ramanan, D.; and Sheikh, Y. 2018. Recycle-GAN: Unsupervised Video Retargeting. In ECCV.
Bashkirova, D.; Usman, B.; and Saenko, K. 2018. Unsupervised Video-to-Video Translation. arXiv preprint arXiv:1806.03698.
Carreira, J.; and Zisserman, A. 2017. Quo Vadis, Action Recognition? A New Model and the Kinetics Dataset. In CVPR.
Chan, C.; Ginosar, S.; Zhou, T.; and Efros, A. A. 2019. Everybody Dance Now. In ICCV.
Chen, D.; Liao, J.; Yuan, L.; Yu, N.; and Hua, G. 2017. Coherent Online Video Style Transfer. In ICCV.
Chen, X.; Zhang, Y.; Wang, Y.; Shu, H.; Xu, C.; and Xu, C. 2020. Optical Flow Distillation: Towards Efficient and Stable Video Style Transfer. In ECCV.
Chen, Y.; Pan, Y.; Yao, T.; Tian, X.; and Mei, T. 2019. Mocycle-GAN: Unpaired Video-to-Video Translation. In ACM Multimedia.
Choi, Y.; Choi, M.; Kim, M.; Ha, J.; Kim, S.; and Choo, J. 2018. StarGAN: Unified Generative Adversarial Networks for Multi-Domain Image-to-Image Translation. In CVPR.
Chu, M.; Xie, Y.; Mayer, J.; Leal-Taixe, L.; and Thuerey, N. 2020. Learning temporal coherence via self-supervision for GAN-based video generation. ACM Transactions on Graphics.
Cordts, M.; Omran, M.; Ramos, S.; Rehfeld, T.; Enzweiler, M.; Benenson, R.; Franke, U.; Roth, S.; and Schiele, B. 2016. The Cityscapes Dataset for Semantic Urban Scene Understanding. In CVPR.
Deng, Y.; Tang, F.; Dong, W.; Huang, H.; Ma, C.; and Xu, C. 2021. Arbitrary Video Style Transfer via Multi-Channel Correlation. In AAAI.
Denton, E. L.; Chintala, S.; Szlam, A.; and Fergus, R. 2015. Deep Generative Image Models using a Laplacian Pyramid of Adversarial Networks. In NIPS.
Gafni, O.; Wolf, L.; and Taigman, Y. 2020. Vid2Game: Controllable Characters Extracted from Real-World Videos. In ICLR.
Gao, C.; Gu, D.; Zhang, F.; and Yu, Y. 2018. ReCoNet: Real-Time Coherent Video Style Transfer Network. In ACCV.
Goodfellow, I. J.; Pouget-Abadie, J.; Mirza, M.; Xu, B.; Warde-Farley, D.; Ozair, S.; Courville, A. C.; and Bengio, Y. 2014. Generative Adversarial Nets. In NIPS.
Gupta, A.; Johnson, J.; Alahi, A.; and Fei-Fei, L. 2017. Characterizing and Improving Stability in Neural Style Transfer. In ICCV.
Hoffman, J.; Tzeng, E.; Park, T.; Zhu, J.; Isola, P.; Saenko, K.; Efros, A. A.; and Darrell, T. 2018. CyCADA: Cycle-Consistent Adversarial Domain Adaptation. In Dy, J. G.; and Krause, A., eds., ICML.
Huang, H.; Wang, H.; Luo, W.; Ma, L.; Jiang, W.; Zhu, X.; Li, Z.; and Liu, W. 2017. Real-Time Neural Style Transfer for Videos. In CVPR.
Huang, X.; Liu, M.; Belongie, S. J.; and Kautz, J. 2018. Multimodal Unsupervised Image-to-Image Translation. In ECCV.
Huang, Xun, and Serge Belongie. "Arbitrary style transfer in real-time with adaptive instance normalization." Proceedings of the IEEE International Conference on Computer Vision. 2017.
Ilg, E.; Mayer, N.; Saikia, T.; Keuper, M.; Dosovitskiy, A.; and Brox, T. 2017. FlowNet 2.0: Evolution of Optical Flow Estimation with Deep Networks. In CVPR.
Isola, P.; Zhu, J.; Zhou, T.; and Efros, A. A. 2017. Image-to-Image Translation with Conditional Adversarial Networks. In CVPR.
Kim, T.; Cha, M.; Kim, H.; Lee, J. K.; and Kim, J. 2017. Learning to Discover Cross-Domain Relations with Generative Adversarial Networks. In ICML.

Kingma, D. P.; and Ba, J. 2015. Adam: A Method for Stochastic Optimization. In ICLR.
Li, X.; Liu, S.; Kautz, J.; and Yang, M. 2019. Learning Linear Transformations for Fast Image and Video Style Transfer. In CVPR.
Liu, K.; Gu, S.; Romero, A.; and Timofte, R. 2021. Unsupervised Multimodal Video-to-Video Translation via Self-Supervised Learning. In WACV.
Liu, M.; Breuel, T.; and Kautz, J. 2017. Unsupervised Image-to-Image Translation Networks. In NIPS.
Liu, M.; Huang, X.; Mallya, A.; Karras, T.; Aila, T.; Lehtinen, J.; and Kautz, J. 2019. Few-Shot Unsupervised Image-to-Image Translation. In ICCV.
Liu, M.; and Tuzel, O. 2016. Coupled Generative Adversarial Networks. In NIPS.
Mallya, A.; Wang, T.; Sapra, K.; and Liu, M. 2020. World-Consistent Video-to-Video Synthesis. In ECCV.
Park, K.; Woo, S.; Kim, D.; Cho, D.; and Kweon, I. S. 2019. Preserving Semantic and Temporal Consistency for Unpaired Video-to-Video Translation. In ACM Multimedia.
Radford, A.; Metz, L.; and Chintala, S. 2016. Unsupervised Representation Learning with Deep Convolutional Generative Adversarial Networks. In ICLR.
Richter, S. R.; Hayder, Z.; and Koltun, V. 2017. Playing for Benchmarks. In ICCV.
Ruder, M.; Dosovitskiy, A.; and Brox, T. 2016. Artistic Style Transfer for Videos. In Rosenhahn, B.; and Andres, B., eds., GCPR.
Shetty, R.; Fritz, M.; and Schiele, B. 2018. Adversarial Scene Editing: Automatic Object Removal from Weak Supervision. In NIPS.
Shrivastava, A.; Pfister, T.; Tuzel, O.; Susskind, J.; Wang, W.; and Webb, R. 2017. Learning from Simulated and Unsupervised Images through Adversarial Training. In CVPR.
Taigman, Y.; Polyak, A.; and Wolf, L. 2017. Unsupervised Cross-Domain Image Generation. In ICLR.
Teed, Z.; and Deng, J. 2020. RAFT: Recurrent All-Pairs Field Transforms for Optical Flow. In ECCV.
Wang, T.; Liu, M.; Tao, A.; Liu, G.; Catanzaro, B.; and Kautz, J. 2019. Few-shot Video-to-Video Synthesis. In NIPS.
Wang, T.; Liu, M.; Zhu, J.; Yakovenko, N.; Tao, A.; Kautz, J.; and Catanzaro, B. 2018. Video-to-Video Synthesis. In NIPS.
Wang, W.; Xu, J.; Zhang, L.; Wang, Y.; and Liu, J. 2020. Consistent Video Style Transfer via Compound Regularization. In AAAI.
Wei, X.; Zhu, J.; Feng, S.; and Su, H. 2018. Video-to-Video Translation with Global Temporal Consistency. In ACM Multimedia.
Yang, X.; Xie, D.; and Wang, X. 2018. Crossing-Domain Generative Adversarial Networks for Unsupervised Multi-Domain Image-to-Image Translation. In ACM Multimedia.
Yi, Z.; Zhang, H. R.; Tan, P.; and Gong, M. 2017. DualGAN: Unsupervised Dual Learning for Image-to-Image Translation. In ICCV.
Zhao, J. J.; Mathieu, M.; and LeCun, Y. 2017. Energy-based Generative Adversarial Networks. In ICLR.
Zhou, Y.; Wang, Z.; Fang, C.; Bui, T.; and Berg, T. L. 2019. Dance Dance Generation: Motion Transfer for Internet Videos. In ICCV.
Zhu, J.; Krähenbühl, P.; Shechtman, E.; and Efros, A. A. 2016. Generative Visual Manipulation on the Natural Image Manifold. In ECCV.
Zhu, J.; Park, T.; Isola, P.; and Efros, A. A. 2017. Unpaired Image-to-Image Translation Using Cycle-Consistent Adversarial Networks. In ICCV.
Zhu, J.; Zhang, R.; Pathak, D.; Darrell, T.; Efros, A. A.; Wang, O.; and Shechtman, E. 2017b. Toward Multimodal Image-to-Image Translation. In NIPS.

* cited by examiner

SYSTEM AND METHOD FOR LEARNING TEMPORALLY CONSISTENT VIDEO SYNTHESIS USING FAKE OPTICAL FLOW

CROSS-REFERENCE TO RELATED APPLICATION

This application claims priority to U.S. Provisional Application Ser. No. 63/191,710 filed on May 21, 2021, which is expressly incorporated herein by reference.

BACKGROUND

There are existing methods that may estimate optical flow. Such methods utilize expensive pre-trained datasets that require management and updating. In many instances, temporal consistency is not accurately regularized. Estimating optical flow through pretrained models are not necessarily accurate and/or provide reliable estimation. This may lead to an inaccurate estimation of the movement in frames that lead to bad translation. Such a wrong estimation may also cause misleading guidance toward temporal consistency. Content of the source image, especially hard categories may be compromised since temporal regularization fails to provide more information to help preserve it.

BRIEF DESCRIPTION

According to one aspect, a computer-implemented method for learning temporally consistent video synthesis using fake optical flow that includes receiving data associated with a source video and a target video. The computer-implemented method also includes processing image-to-image translation across domains of the source video and the target video. Unsupervised losses are implemented to construct bidirectional unsupervised temporal regularization to facilitate the image-to-image translation. The computer-implemented method additionally includes processing a synthesized temporally consistent video based on the image-to-image translation. The computer-implemented method further includes training a neural network with data that is based on synthesizing of the source video and the target video.

According to another aspect, a system for learning temporally consistent video synthesis using fake optical flow that includes a memory storing instructions when executed by a processor cause the processor to receive data associated with a source video and a target video and process image-to-image translation across domains of the source video and the target video. Unsupervised losses are implemented to construct bidirectional unsupervised temporal regularization to facilitate the image-to-image translation. The instructions also cause the processor to process a synthesized temporally consistent video based on the image-to-image translation. The instructions further cause the processor to train a neural network with data that is based on synthesizing of the source video and the target video.

According to yet another aspect, a non-transitory computer readable storage medium storing instruction that when executed by a computer, which includes a processor perform a method that includes receiving data associated with a source video and a target video. The method also includes processing image-to-image translation across domains of the source video and the target video. Unsupervised losses are implemented to construct bidirectional unsupervised temporal regularization to facilitate the image-to-image translation. The method additionally includes processing a synthesized temporally consistent video based on the image-to-image translation. The method further includes training a neural network with data that is based on synthesizing of the source video and the target video.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Figure 1:
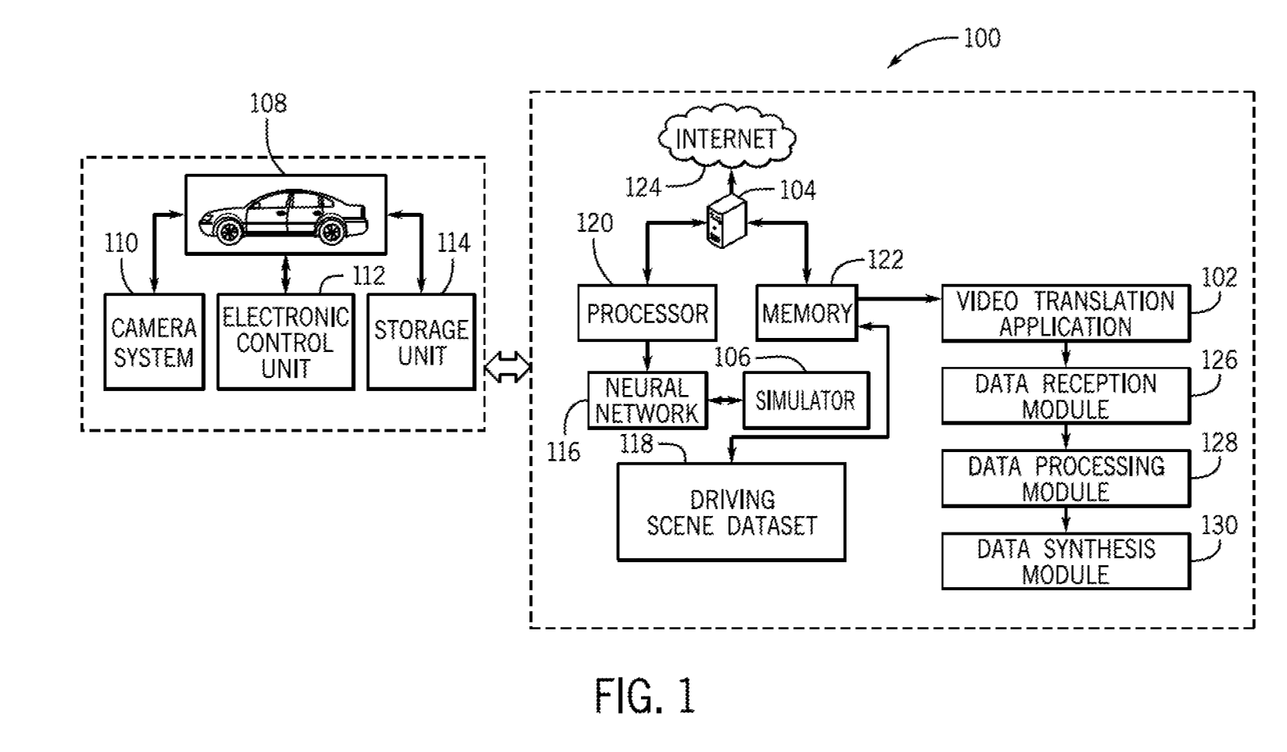
FIG. 1 is a schematic view of an exemplary system for learning temporally consistent video synthesis using fake optical flow according to an exemplary embodiment of the present disclosure.

Referring now to the drawings, wherein the showings are for purposes of illustrating one or more exemplary embodiments and not for purposes of limiting same, FIG. 1 is a schematic view of an exemplary system 100 for learning temporally consistent video synthesis using fake optical flow according to an exemplary embodiment of the present disclosure. The components of the system 100, as well as the components of other systems, hardware architectures, and software architectures discussed herein, may be combined, omitted, or organized into different architectures for various embodiments.

Generally, the system 100 includes a synthetic optical flow video-to-video translation application (video translation application) 102 that may be executed by an externally hosted computing infrastructure (external server) 104. The video translation application 102 may be configured to provide an unsupervised recycle loss as well as unsupervised spatial loss to construct a bidirectional unsupervised temporal regularization manner to facilitate efficient and accurate translation. The video translation application 102 utilizes these two branches of bidirectional unsupervised losses to achieve a state-of-the art performance on generating temporally consistent as well as semantic preserved videos.

In one embodiment, source video data that is associated with a source video and target video data that is associated with a target video may be received by the video translation application 102. The video translation application 102 may be configured to conduct video style transfer to synthesize optical flows of the source video and the target video based on processing of the source image data and the target video data. The video translation application 102 provides an improvement in the technology of video aggregation and synthesis with respect to videos that include respective domains (e.g., respective objects, environments, backgrounds, etc.) to output synthesized videos that preserve the content of both the source video and the target video across respective domains and that are temporally consistent with respect to the optical flow of motion that is included within both the source video and the target video.

In one embodiment, the video translation application 102 may be configured to receive source video data or target video data that is associated with a simulated driving scene video that is provided by a simulator 106. In one configuration, the simulator 106 may provide software-based driving simulation videos where elements of a virtual driving scene may be controlled to conduct immersive user experiments. Each software-based driving simulation video associated with the simulated driving scene video may be computed by the simulator 106 and converted to image data that may be output to the video translation application 102. Accordingly, the driving scene included within the simulated driving scene videos may be included as part of a domain of the simulated driving scene videos.

Additionally, the video translation application 102 may be configured to receive real-world driving scene videos where elements of a real-world driving scene may be provided based on an operation of a vehicle 108. The real-world driving scene may be provided based on videos that are captured by a camera system 110 of the vehicle 108. The real-world driving scene may include a real-world surrounding environment of the vehicle 108 as it is being operated. The real-world driving scene may include, but may not be limited to, roadways on which the vehicle 108 is traveling, the environment (background) in which the vehicle 108 is traveling (e.g., near mountains, near buildings, near flatland, etc.), static objects (e.g., traffic post, road signage) that may be located within the surrounding environment of the vehicle 108, and dynamic objects that may be located within the surrounding environment of the vehicle 108 (e.g., additional vehicles, pedestrians). Accordingly, the real-world driving scene included within the real-world driving scene videos may be included as part of the domain of the real-world driving scene videos.

In one embodiment, the video translation application 102 may be configured to select a key frame of a plurality of frames of the real-world driving scene video and a key frame of a plurality of frames of the simulated driving scene video. Each of the key frames may include a middle frame of n number of frames. In one configuration, the video translation application 102 may be configured to identify the key frame of the simulated driving scene video provided by the simulator 106 as a source video and the key frame of the real-world driving scene video provided by the vehicle 108 as target video.

Figure 2:
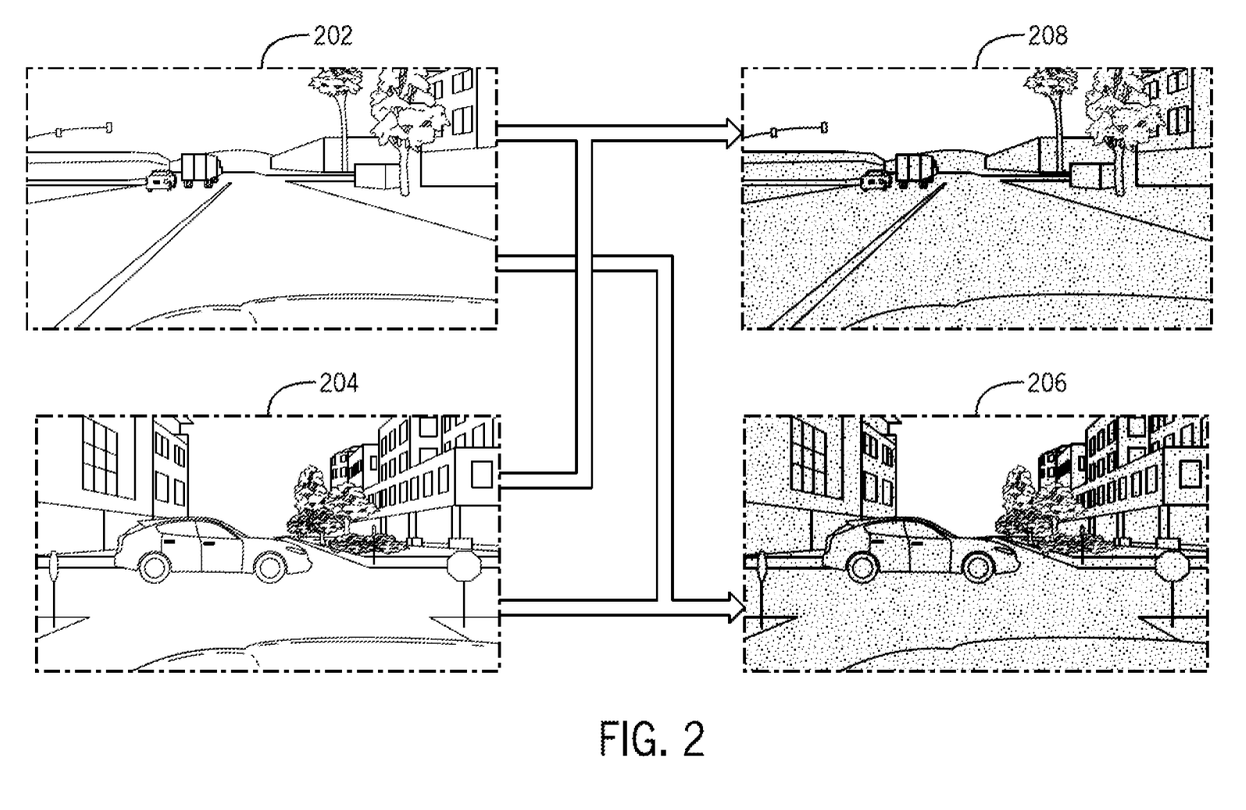
FIG. 2 is an illustrative example of video simulation of a source video and a target video in a driving scene domain according to an exemplary embodiment of the present disclosure.

As represented in FIG. 2, an illustrative example of video simulation of the source video and the target video, the video translation application 102 may be able to synthesize the source video 202 which includes the key frame of the simulated driving scene video provided by the simulator 106 with the target video 204 which includes the key frame of the real-world driving scene video provided by the vehicle 108. Alternatively, the video translation application 102 may be configured to identify the key frame of the real-world driving scene as a source video 202 and the key frame of the simulated driving scene video as a target video 204.

As discussed, the video translation application 102 may be configured to select a key frame of a plurality of frames of the source video 202 and a key frame of a plurality of frames of the target video 204. Each of the key frames may include a middle frame of n number of frames. The video translation application 102 may be configured to simulate adjacent frames of the key frame of the source video 202 and/or the target video 204 by warping the key frame with a generated fake optical flow. This functionality may enable accuracy and consistency of movements across the respective domains of the source video 202 and the target video 204. In one configuration, the video translation application 102 may be configured to provide image-to-image translation as a universal translation method.

The video translation application 102 may provide unsupervised recycle loss in which a movement in one domain is consistent with a same movement in another domain. As such, the synthesis of the source video 202 and the target video 204 may ensure that movement of the source domain is consistent with movement in the target domain and the movement in the target domain is consistent with movement in the source domain with respect to one or more synthesized videos 206, 208 computed by the video translation application 102.

In particular, the movement may be represented by warping images with generated optical flow. Accordingly, the video translation application 102 provides unsupervised spatial loss in which a movement in one domain causes a similar amount of corresponding movement in another domain. The video translation application 102 may additionally provide perceptual loss such that the source video 202 and the target video 204 includes the same content upon completion of the translation processing by the application 102.

With continued reference to FIG. 2, a synthesized source video 206 and/or a synthesized target video 208 may be computed that includes consistent spatial-temporal flow such that movement that is captured within the source video 202 is synchronized with movement that is captured within the target video 204 and/or movement that is captured within the target video 204 is synchronized with movement that is captured within the source video 202.

Accordingly, movement and elements that are included within the real-world driving scene may be translated to the simulated driving scene and movement and elements that are included within the simulated driving scene may be translated to the real-world driving scene. Stated differently, the video translation application 102 may be configured to provide unsupervised spatial loss in which a movement in the source domain causes a similar amount of corresponding movement in the target domain as shown within the synthesized source video 206 and/or the synthesized target video 208.

For example, within the synthesized source video 206, the real-world scene of the target video 204 may be translated to the source video 202 and the optical flow associated with the movement of objects (e.g., other vehicles in the scene) may be adjusted to correspond such that movement may correspond across two different domains. Additionally, within the synthesized target video 208, the simulated source scene of the source video 202 may be translated to the real-world scene of the target video 204 and the optical flow associated with the movement of objects (e.g., other vehicles in the scene) may be adjusted to correspond such that movement may correspond across two different domains.

In an exemplary embodiment, the video translation application 102 may be configured to convert the synthesized source video 206 and/or synthesized target video 208 into synthesized video data that may be utilized to train a neural network 116 that may be executed by the external server 104. In some embodiments, the neural network 116 may be accessed to provide data that may be associated with one or more driving scenes of the vehicle 108. Such data may be utilized to provide predictions, measurements, overlapping propensity, and/or additional information that may be analyzed to provide autonomous functionality, semi-autonomous functionality, alerts, and/or additional functions with respect to the operation of the vehicle 108 within a respective driving scene (e.g., within one or more domains). In other configurations, data provided by the neural network 116 may be utilized to evaluate driver behaviors between simulated, synthesized, and/or the real-world videos.

It is appreciated that for purposes of simplicity the execution of the video translation application 102 is described herein as applying to videos of synthesized and real-world driving scenes. However, it is to be appreciated that the functionality of the video translation application 102 may be utilized to provide synthetic optical flows to output synthesized temporally consistent videos that may be associated with various domains, including but not limited to non-driving domains. For example, the functionality of the video translation application 102 may be utilized to provide synthetic optical flows to output synthesized temporally consistent videos associated with a plurality of simulated videos that may be associated with gaming domains, a plurality of real-world videos that may be associated with non-driving environments, and the like.

Figure 3:
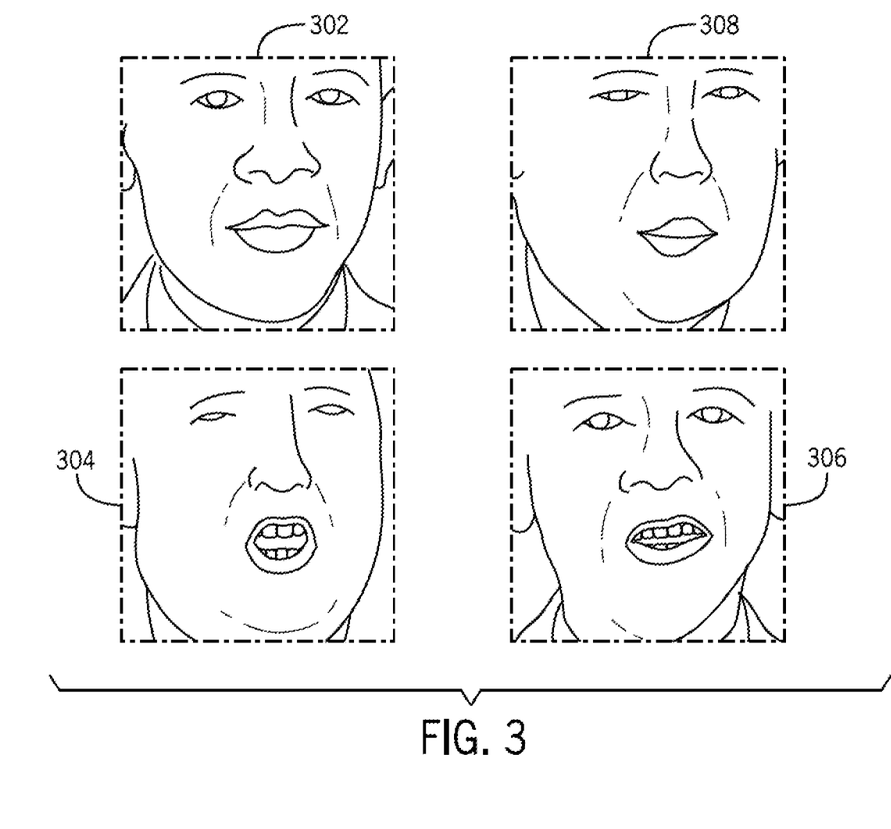
FIG. 3 is an illustrative example of video simulation of a source video and a target video in non-vehicular domain according to an exemplary embodiment of the present disclosure.

FIG. 3 is an illustrative example of video simulation of a source video and a target video in non-vehicular domain according to an exemplary embodiment of the present disclosure. As shown in FIG. 3, a particular frame of a source video 302 may include a real-world video of a first individual and a particular frame of a target video 304 may include a real-world video of a second individual. The video translation application 102 may be configured to provide unsupervised spatial loss in which a movement in the source domain from the source video 302 causes a similar amount of corresponding movement in the target domain of the target video 304 as shown within the synthesized source video 306 and/or the synthesized target video 308.

In one embodiment, the video translation application 102 may additionally provide perceptual loss with respect to the source video and the target video. Accordingly, the video translation application 102 provides an unsupervised recycle loss as well as unsupervised spatial loss to construct a bidirectional unsupervised temporal regularization manner to facilitate efficient and accurate translation. Within the illustrative example of FIG. 3, this may result in the facial and mouth movements of both individuals being synchronized within the synthesized source video 306 and/or the synthesized target video 308. In particular, as shown, the synthesized source video 306 of the first individual may include similar facial and mouth movements to those exhibited by the second individual from the target video 304. Similarly, the synthesized target video 208 of the second individual may include similar facial and mouth movements to those exhibited by the first individual from the source video 302.

With particular reference to the illustrative embodiment of FIG. 1, the vehicle 108 may include an electronic control unit (ECU) 112. The ECU 112 may execute one or more applications, operating systems, vehicle system and subsystem executable instructions, among others. In one or more embodiments, the ECU 112 may include a respective microprocessor, one or more application-specific integrated circuit(s) (ASIC), or other similar devices. The ECU 112 may also include respective internal processing memory, an interface circuit, and bus lines for transferring data, sending commands, and communicating with the plurality of components of the vehicle 108.

The ECU 112 may also include a respective communication device (not shown) for sending data internally to components of the vehicle 108 and communicating with externally hosted computing systems. The ECU 112 may be operably connected to a storage unit 114 of the vehicle 108. The ECU 112 may communicate with the storage unit 114 to execute one or more applications, operating systems, vehicle systems and subsystem user interfaces, and the like that are stored upon the storage unit 114. The storage unit 114 of the vehicle 108 may also be configured to store one or more executable files associated with one or more operating systems, applications, associated operating system data, application data, vehicle system and subsystem user interface data, and the like that are executed by the ECU 112.

In one or more embodiments, the storage unit 114 of the vehicle 108 may be configured to store image data associated with one or more real-world driving videos and/or real-world driving images that are captured by the camera system 110 of the vehicle 108 of the real-world driving scene of the vehicle 108. The storage unit 114 may be accessed by the video translation application 102 to access the image data associated with one or more real-world driving videos. The one or more real-world driving videos may be utilized as source videos or target videos to output synthesized temporally consistent videos based on the synthesis of the one or more real-world driving videos with one or more simulated driving scene videos.

In an exemplary embodiment, the camera system 110 of the vehicle 108 may include one or more cameras that are positioned at one or more exterior portions of the vehicle 108. The camera(s) of the camera system 110 may be positioned in a direction to capture the surrounding environment of the vehicle 108 that includes a driving scene of the vehicle 108 located around (front/sides/behind) the vehicle 108.

In one or more configurations, the one or more cameras of the camera system 110 may be disposed at external front, rear, and/or side portions of the vehicle 108 including, but not limited to different portions of the bumpers, lighting units, fenders/body panels, and/or windshields. The one or more cameras may be positioned on a respective planar sweep pedestal (not shown) that allows the one or more cameras to be oscillated to capture images of the surrounding environment of the vehicle 108.

The camera system 110 may be configured to output image data associated with each of the real-world driving videos. The image data may be stored upon the storage unit 114 of the vehicle 108 and/or communicated directly to the video translation application 102 through wireless communications that occur from a communication unit (not shown) of the vehicle 108 through an internet cloud 124 to a communication unit (not shown) of the external server 104. As discussed, a key frame from one or more real-world driving videos may be selected and utilized as source data or target data to be synthesize the source video and the target video.

In one embodiment, the communication unit of the vehicle 108 may be configured to connect to the internet cloud 124 to send and receive communication signals to and from the external server 104. The external server 104 may host the neural network 116 and may execute the video translation application 102 to utilize processing power to train the neural network 116 with driving scene data associated with various driving scenes based on the synthesized video data associated with the synthesis of a real-world driving scene video and the simulated driving scene video.

In one configuration, the neural network 116 may be configured as a recurrent neural network such as a long term short term memory neural network (LTSM) that may be configured to classify, process, and make predictions based on time series data. In one embodiment, the neural network 116 may be trained at one or more time steps with synthesized video data based on a plurality of simulations that are processed by the simulator 106 and real-world driving scene video that is captured and provided as image data by the camera system 110 of the vehicle 108. The training of the neural network 116 may allow the vehicle 108 to receive data pertaining to real-time driving scene scenarios that may occur within the driving scene of the vehicle 108. The neural network 116 may execute reinforcement learning techniques to provide data that may be associated with one or more driving scenes of the vehicle 108 to provide data that may be utilized to provide predictions, measurements, overlapping propensity, and/or additional information that may be utilized to provide autonomous functionality, semi-autonomous functionality, alerts, and/or additional functions with respect to the operation of the vehicle 108 within a respective driving scene.

In an exemplary embodiment, components of the external server 104 including the neural network 116 may be operably controlled by a processor 120. The processor 120 may be configured to operably control the neural network 116 to utilize machine learning/deep learning to provide artificial intelligence capabilities based on synthesized video data inputted to a driving scene dataset 118.

With continued reference to the external server 104, the processor 120 may be operably connected to a memory 122. The memory 122 may store one or more operating systems, applications, associated operating system data, application data, executable data, and the like. In one embodiment, the processor 120 may be configured to process information associated with the agent states at one or more time steps that may be utilized to train the neural network 116 by updating the driving scene dataset 118 stored on the memory 122.

In one or more embodiments, the simulator 106 may be included as part of the neural network 116 and may execute one or more automated simulated models (simulations) of the driving scene of the vehicle 108 as a virtual vehicle (not shown). The simulator 106 may be configured to output image data associated with one or more simulated driving scene videos that pertain to the simulations executed by the simulator 106. The simulated driving scene videos may include various positions of the vehicle 108 with respect to various types of simulated vehicle dynamics, various simulated maneuvers that may be completed by the vehicle 108, and/or various simulated environmental attributes of the vehicle 108.

The simulated environmental attributes may include various types of roadway settings that include different types of roadways. For example, the different types of roadways may include a single lane roadway, a double lane roadway, a highway, an intersection, a merge lane, a cross-walk, and one or more sections of the roadway that may include particular angles of curvatures and/or inclines. The environmental attributes may also include the inclusion of one or more objects that may be located within the simulated driving scene that may include, one or more static objects such as traffic cones, curbs, street signs, guardrails, and/or one or more dynamic objects that may include pedestrians and additional agents.

In some configurations, the video translation application 102 may communicate with the neural network 116 to utilize the simulator 106 to perform machine learning/deep learning methods to provide artificial intelligence capabilities to execute a plurality of driving scene simulations to provide various simulated driving scene videos that include various domains. The various simulated driving scene videos may be configured as including one or more environmental attributes to determine one or more novel unexplored driving scene states that may have not been previously trained to the neural network 116.

In one or more embodiments, the driving scene dataset 118 may be configured as a machine learning dataset that includes one or more fields associated with various synthesized scenes of various domains. As discussed, the synthesized driving scenes may be output by the video translation application 102 as a synthesis of one or more real-world driving scene videos and one or more simulated driving scene videos. The various synthesized driving scenes of various domains may include various types of environments (e.g., mountain, hilly, flat, water front, etc.), various types of roadways (e.g., intersections, highways, offramps, two lane roads, more than two lane roads, etc.), various types of static and/or dynamic objects (e.g., roadway infrastructure, additional vehicles, pedestrians, etc.), and the like.

For example, the driving scene dataset 118 may include a field that pertains to a synthesized driving scene that may include a particular of a roadway that includes a particular number of lanes of the roadway, boundaries of the roadway, a particular curvature and/or incline of the roadway, a type of roadway, additional attributes of the roadway (e.g., intersection, on/off-ramps), one or more static objects and/or one or more dynamic objects at one or more time steps that are included on or near the roadway of a simulated driving scene of the vehicle 108.

The neural network 116 may be trained by populating the fields of the driving scene dataset 118 with the synthesized video data that is associated with the synthesis of the source video and the target video to provide data associated with various synthesized driving scenes of the vehicle 108. Such data may be accessed at one or more points in time to provide data that may be utilized to provide one or more commands to one or more control units (not shown) of the vehicle 108 to operate the vehicle 108 in a driving environment that may be similar with respect to environment type, roadways, objects, infrastructure, positions/locations of static objects, positions/locations of dynamic objects, domain, and the like to one or more one or more synthesized driving-scene videos that may be associated with particular synthesized video data.

In an exemplary embodiment, the ECU 112 may autonomously control the vehicle 108 within a current driving scene and/or similar driving scenes that include similar driving and environmental scenarios to those included within the driving scene dataset 118 to control the vehicle 108 to perform one or more maneuvers to operate based on data that may be stored and retrieved from the driving scene dataset 118 of the neural network 116. In particular, data retrieved from the driving scene dataset 118 may be used to provide predictions, measurements, overlapping propensity, and/or additional information that may be analyzed to provide control the vehicle 108 to operate autonomously or semi-autonomously or to provide alerts, and/or additional functions with respect to the operation of the vehicle 108 within a current driving scene (e.g., within one or more domains). In other configurations, data retrieved from the driving scene dataset 118 may be utilized to evaluate driver behaviors between simulated, synthesized, and/or the real-world videos.

In one embodiment, the processor 120 may additionally be configured to utilize the communication unit of the external server 104 to connect to the internet cloud 124 to send and receive communication signals to and from the vehicle 108. In particular, the external server 104 may receive image data that may be communicated by the camera system 110 of the vehicle 108 to provide real-world driving scene videos to the video translation application 102.

II. The Synthetic Optical Flow Video-to-Video Translation Application and Related Methods The components of the video translation application 102 will now be described according to an exemplary embodiment and with reference to FIG. 1. In an exemplary embodiment, the video translation application 102 may be stored on the memory 122 and executed by the processor 120 of the external server 104. In another embodiment, the video translation application 102 may be stored on the storage unit 114 of the vehicle 108 and may be executed by the ECU 112 of the vehicle 108.

The general functionality of the video translation application 102 will now be discussed. In an exemplary embodiment, the video translation application 102 may include a data reception module 126, a data processing module 128, and a data synthesis module 130. However, it is to be appreciated that the video translation application 102 may include one or more additional modules and/or sub-modules that are included in addition to the modules 126-130. Methods and examples describing process steps that are executed by the modules 126-130 of the video translation application 102 will now be described in more detail.

Figure 4:
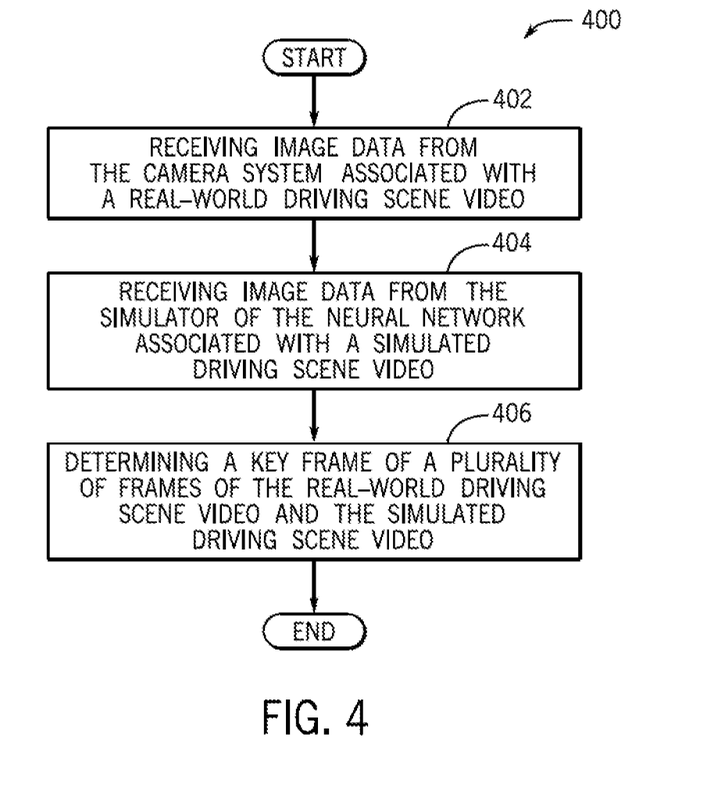
FIG. 4 is a process flow diagram of a method of receiving real-world driving scene video and simulated driving scene video and processing the videos according to an exemplary embodiment of the present disclosure.

FIG. 4 is a process flow diagram of a method 400 of receiving real-world driving scene video and simulated driving scene video and processing the videos according to an exemplary embodiment of the present disclosure. FIG. 4 will be described with reference to the components of FIG. 1 though it is to be appreciated that the method of FIG. 4 may be used with other systems/components. The method 400 may begin at block 402, wherein the method 400 may include receiving image data from the camera system 110 associated with a real-world driving scene video.

In an exemplary embodiment, the data reception module 126 of the video translation application 102 may be configured to communicate with the camera system 110 of the vehicle 108 to receive image data associated with one or more real-world driving scene videos. In another embodiment, the data reception module 126 may be configured to access the storage unit 114 and retrieve image data that may be associated with one or more real-world driving scene videos, as previously stored by the camera system 110. As discussed above, the real-world driving scene may include a real-world surrounding environment of the vehicle 108 as it is being operated.

The real-world driving scene may include, but may not be limited to, roadways on which the vehicle 108 is traveling, the environment (background) in which the vehicle 108 is traveling (e.g., near mountains, near buildings, near flatland, etc.), static objects (e.g., traffic post, road signage) that may be located within the surrounding environment of the vehicle 108, and dynamic objects that may be located within the surrounding environment of the vehicle 108 (e.g., additional vehicles, pedestrians). Accordingly, the real-world driving scene included within the real-world driving scene videos may be included as part of the domain of the real-world driving scene videos.

The method 400 may proceed to block 404, wherein the method 400 may include receiving image data from the simulator 106 of the neural network 116 associated with a simulated driving video. In an exemplary embodiment, the data reception module 126 of the video translation application 102 may be configured to communicate with the simulator 106 to receive image data associated with one or more simulated driving scene videos. As discussed above, the simulator 106 may be configured to output image data associated with one or more simulated driving scene videos that pertain to the simulations executed by the simulator 106. The simulated driving scene videos may include various positions of the vehicle 108 with respect to various types of simulated vehicle dynamics, various simulated maneuvers that may be completed by the vehicle 108, and/or various simulated environmental attributes of the vehicle 108.

The simulated environmental attributes may include various types of roadway settings that include different types of roadways. The environmental attributes may also include the inclusion of one or more objects that may be located within the simulated driving scene that may include, one or more static objects such as traffic cones, curbs, street signs, guardrails, and/or one or more dynamic objects that may include pedestrians and additional agents.

With continued reference to FIG. 4, the method 400 may proceed to block 406, wherein the method 400 may include determining a key frame of a plurality of frames of the real-world driving scene video and the simulated driving scene video. In one embodiment, the data reception module 126 may be configured to communicate the image data to the data processing module 128. In an exemplary embodiment, the data processing module 128 may be configured to analyze the image data associated with the real-world driving scene video and the image data associated with the simulated driving scene video to determine a plurality of frames of each video. The plurality of frames may include image frames that may be captured for a plurality of respective timestamps as the vehicle 108 is being operated in a real-world driving scene and as a virtual representation of the vehicle 108 may be operated within a simulated driving scene as executed by the simulator 106.

Upon determining the plurality of frames of each video, the data processing module 128 may be configured to determine a key frame from the plurality of frames associated with the real-world driving scene video and a key frame from the plurality of frames associated with the simulated driving scene video. Each of the key frames may include a middle frame of n number of frames. As discussed in more detail below, adjacent frames of the key frame of the source video and/or the target video may be utilized to warp the key frame with a generated fake optical flow to provide image-to-image translation as a universal translation method.

Figure 5:
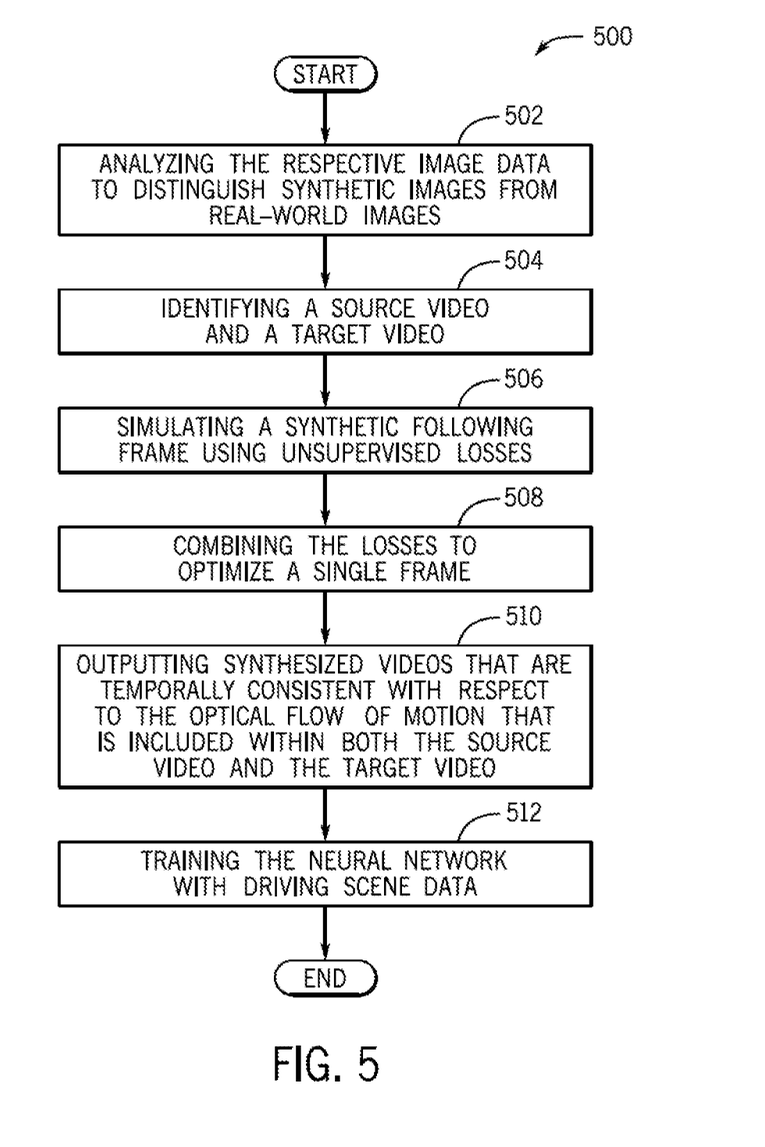
FIG. 5 is a process flow diagram of a method for outputting synthesized videos that are temporally consistent with respect to the optical flow of motion across domains according to an exemplary embodiment of the present disclosure.

FIG. 5 is a process flow diagram of a method 500 for outputting synthesized videos that are temporally consistent with respect to the optical flow of motion across domains according to an exemplary embodiment of the present disclosure. FIG. 5 will be described with reference to the components of FIG. 1 though it is to be appreciated that the method of FIG. 5 may be used with other systems/components. The method 500 may begin at block 502, wherein the method 500 may include analyzing the respective image data to distinguish synthetic images from real-world images.

In an exemplary embodiment, the data reception module 126 may also be configured to communicate the image data to the data synthesis module 130 of the video translation application 102. Additionally, the data processing module 128 may communicate data associated with the plurality of frames of the real-world driving scene video and the plurality of frames of the simulated driving scene video in addition to the respectively selected key frames of the real-world driving scene video and the simulated driving scene video.

In one embodiment, the data synthesis module 130 may translate the domain of the real-world driving scene video and the simulated driving scene video based on trained generators and discriminators. In one configuration, the generators and discriminators may be trained in a zero-sum game. The data synthesis module 130 may be configured to utilize an adversarial loss. In particular, the discriminators $D_X/D_Y$ may be optimized so that they may distinguish between synthetic images $\hat{x}_t/\hat{y}_s$ that are associated with the simulated driving scene video from real-world images $x_t/y_s$ that are associated with the real-world driving scene video.

Additionally, the generators are trained to synthesize realistic images using:

$$\min\max \mathcal{L}_{adv} = \sum_s \log D_Y(y_s) + \sum_t \log(1 - D_Y(\hat{y}_s)) + \sum_t \log D_X(x_t) + \sum_s \log(1 - D_X(\hat{x}_t))$$

The method 500 may proceed to block 504, wherein the method 500 may include identifying a source video and a target video. In an exemplary embodiment, upon distinguishing between synthetic images $\hat{x}_t/\hat{y}_s$ that are associated with the simulated driving scene video from real-world images $x_t/y_s$ that are associated with the real-world driving scene video, the data synthesis module 130 may be configured to determine that the key frame associated with a real-world image that is from the real-world driving scene video and the key frame associated with a synthetic image that is from the simulated driving scene video as either a source video or a target video. Accordingly, the data synthesis module 130 may be configured to identify the key frame of the simulated driving scene video provided by the simulator 106 as a source video and the key frame of the real-world driving scene video provided by the vehicle 108 as a target video. Alternatively, the data synthesis module 130 may be configured to identify the key frame of the real-world driving scene video as a source video and the key frame of the simulated-world driving scene video as a target video.

The data synthesis module 130 may be configured to overcome any temporal and sematic inconsistency with respect to unpaired video-to-video translation tasks. Given the source video $x_{1:T} = \{x_t\}_{t=1}^T$ with T frames from the source domain X, and the target video $y_{1:S} = \{y_s\}_{s=1}^S$ with S frames from the target domain Y, the data synthesis module 130 may be configured to learn a mapping $G_Y: X \rightarrow Y$ as well as the opposite mapping $G_X: Y \rightarrow X$ implemented on two of the generators without any paired videos or frames as input. With the learned generators the videos are synthesized as $x_{1:T} = \{\hat{x}_t\}_{t=1}^T$ where $\hat{x}_t = G_Y(x_t)$, and $\hat{y}_{1:S} = \{\hat{y}_s\}_{s=1}^S$ 232 where $\hat{y}_s = G_X(y_s)$.

The method 500 may proceed to block 506, wherein the method 500 may include simulating a synthetic following frame using unsupervised losses. In an exemplary embodiment, the data synthesis module 130 may be configured to represent movement found within the key frame by warping images with generated optical flow. Accordingly, an unsupervised spatial loss is provided in which a movement in one domain causes a similar amount of corresponding movement in another domain. In particular, given the source frame $x_t$ as the t-th frame from source video $x_{1:T}$, the data synthesis module 130 is configured to simulate the synthetic following frame $\tilde{x}_{t+1} = W(x_t, f)$ by warping the current frame with a synthetic optical flow:

$$\tilde{f}: W(x_t, f) = F(x_t, f) + \Delta$$

where F represents the warping operation with a synthetic optical flow and $\Delta$ represents local noise in pixel.

The data synthesis module 130 may implement an unsupervised recycle loss such that given an original frame $x_t/y_s$ and its translated frame $\hat{x}_t/\hat{y}_s$, the data synthesis module 130 is configured to simulate their synthetic following frame $\tilde{x}_{t+1}/\tilde{y}_{s+1}$ and $W(\hat{x}_t,f)/W(\hat{y}_s, f)$ through a warping operation with an identical synthetic optical flow $\tilde{f}$. The data synthesis module 130 may be configured to use the synthetic optical flow that ensures the consistency of the motion across domains. Consequently, the risk of error from any module irrelevant to the translation process is minimized, and the accuracy of spatiotemporal consistency guidance is ensured.

In particular, the data synthesis module 130 is configured to map $W(\hat{x}_t,f)/W(\hat{y}_s, f)$ back to the original domain and enforce its consistency with $\tilde{x}_{t+1}/\tilde{y}_{s+1}$.

$$\mathcal{L}_{ur} = \sum_t \|\tilde{x}_{t+1} - G_X(W(\hat{x}_t, \tilde{f}))\|_1 + \sum_s \|\tilde{y}_{s+1} - G_Y(W(\hat{y}_s, \tilde{f}))\|_1$$

In an exemplary embodiment, the data synthesis module 130 may also be configured to implement an unsupervised spatial loss at the same time as the implementation of the unsupervised recycle loss. In one configuration, the implementation of the unsupervised recycle loss enforces the consistency between $x_{t+1}/\tilde{y}_{s+1}$ and $W(\hat{x}_t,f)/W(\hat{y}_s, f)$ in the opposite direction. This allows a perceptual loss to be provided to allow a pair of images before and after the image-to-image translation to include same content. Practically, $\tilde{x}_{t+1}/\tilde{y}_{s+1}$ is mapped to the other domain to be consistent with $W(\hat{x}_t,f)/W(\hat{y}_s, f)$ $$\mathcal{L}_{us} = \sum_t \|G_Y(\tilde{x}_{t+1}) - W(\hat{x}_t, \tilde{f})\|_1 + \sum_s \|G_Y(\tilde{y}_{s+1}) - W(\hat{y}_s, \tilde{f})\|_1$$

With the help of the pseudo-supervision from synthetic optical flow, the unsupervised losses includes mistakes only from inconsistent translation processes in $G_X$ and $G_Y$, and minimizing the loss value leads to direct improvement in the quality of translation without misleading the generators. Accordingly, the data synthesis module 130 provides synthetic optical flows to warp images to produce synthetic adjacent frames and unsupervised recycle loss is provided in which a movement in one domain that is associated with the source video is consistent with a movement in another domain that is associated with the target video.

The method 500 may proceed to block 508, wherein the method 500 may include combining the losses to optimize a single frame. In an exemplary embodiment, the loss functions from the unsupervised losses (implemented at block 506) may be combined. In particular, the loss functions of the unsupervised recycle loss and the unsupervised spatial loss may be combined to optimize a single-frame such as the key frame of each of the source video and the target video (e.g., associated with the real-world driving scene video and/or the simulated driving scene video) to optimize a single-frame based unpaired video-to-video translation:

$$\mathcal{L} = \mathcal{L}_{adv} + \text{Reject}_{ur} \mathcal{L}_{ur} + \text{Reject}_{us} \mathcal{L}_{us}$$

The method 500 may proceed to block 510, wherein the method 500 may include outputting synthesized videos that are temporally consistent with respect to the optical flow of motion that is included within both the source video and the target video. The unsupervised recycle loss as well as the unsupervised spatial loss are implemented and the losses are combined to construct a bidirectional unsupervised temporal regularization manner which is executed by the video translation application 102 to facilitate image-to-image translation across domains of the source video and the target video and compute a synthesized temporally consistent video associated with the source video and target video.

The bidirectional unsupervised temporal regularization manner which is executed by the data synthesis module 130 of the video translation application 102 to facilitate image-to-image translation across domains of the real-world driving scene video and/or the simulated driving scene video is completed to output simulated driving scene data. The simulated driving scene data may include movement and elements that are included within the real-world driving scene and translated to the simulated driving scene and movement and elements that are included within the simulated driving scene and translated to the real-world driving scene.

The method 500 may proceed to block 512, wherein the method 500 may include training the neural network 116 with driving scene data. In an exemplary embodiment, the data synthesis module 130 may be configured to communicate simulated driving scene data to the neural network 116 to train the neural network 116. Accordingly, the neural network 116 may be trained at one or more time steps with data associated synthesized video data based on a plurality of simulations that are processed by the simulator 106 and real-world driving scene video that is captured at one or more points in time and provided as image data by the camera system 110 of the vehicle 108.

In particular, the neural network 116 may be trained by populating the fields of the driving scene dataset 118 with the driving scene data based on the synthesized video data that is associated with the synthesis of the source video and the target video to provide data associated with various synthesized driving scenes of the vehicle 108. The driving scene data may be accessed at one or more points in time to provide one or more commands to one or more control units (not shown) of the vehicle 108 to operate the vehicle 108 in a driving environment that may be similar with respect to environment type, roadways, objects, infrastructure, positions/locations of static objects, positions/locations of dynamic objects, domain, and the like to one or more one or more synthesized driving-scene videos that may be associated with particular synthesized video data.

Figure 6:
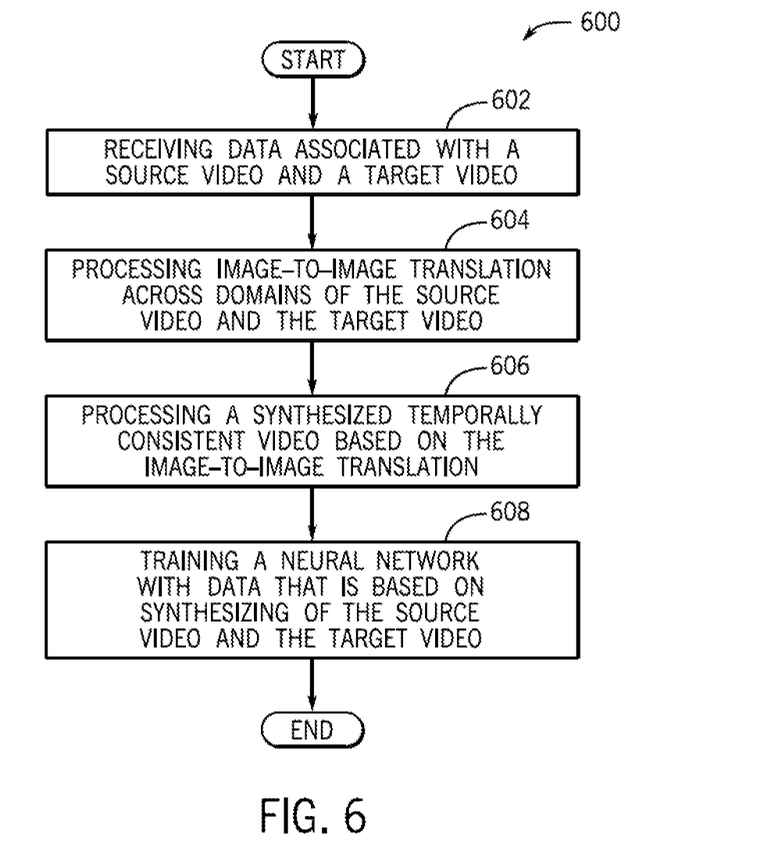
FIG. 6 is a process flow diagram of a method for learning temporally consistent video synthesis using fake optical flow according to an exemplary embodiment of the present disclosure.

FIG. 6 is a process flow diagram of a method 600 for learning temporally consistent video synthesis using fake optical flow according to an exemplary embodiment of the present disclosure. FIG. 6 will be described with reference to the components of FIG. 1 though it is to be appreciated that the method of FIG. 6 may be used with other systems/components. The method 600 may begin at block 602, wherein the method 600 may include receiving data associated with a source video and a target video.

The method 600 may proceed to block 604, wherein the method 600 may include processing image-to-image translation across domains of the source video and the target video. In one embodiment, unsupervised losses are implemented to construct bidirectional unsupervised temporal regularization to facilitate the image-to-image translation. The method 600 may proceed to block 606, wherein the method 600 may include processing a synthesized temporally consistent video based on the image-to-image translation. The method 600 may proceed to block 608, wherein the method 600 may include training a neural network 116 with data that is based on synthesizing of the source video and the target video.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for learning temporally consistent video synthesis using fake optical flow comprising:
   receiving data associated with a source video and a target video;
   processing image-to-image translation across domains of the source video and the target video, wherein unsupervised losses are implemented to construct bidirectional unsupervised temporal regularization to facilitate the image-to-image translation;
   processing a synthesized temporally consistent video based on the image-to-image translation; and
   training a neural network with data that is based on synthesizing of the source video and the target video, wherein
   processing image-to-image translation across the domains and processing the synthesized temporally consistent video includes:
   determining a plurality of frames for each of the source video and the target video, and determining a source video key frame of the plurality of frames of the source video and a target video key frame of the plurality of frames of the target video with the source video key frame being a middle frame of the plurality of frames of the source video and the target video key frame being a middle frame of the plurality of frames of the target video; and
   implementing an identical synthetic optical flow as a warping operation including using an original frame of at least one of the plurality of frames of the source video and the plurality of frames of the target video, and a translated frame, associated with the original frame, of at least one of the plurality of frames of the source video and the plurality of frames of the target video to simulate synthetic adjacent frames for each of the original frame in an original domain of the domains and the translated frame in a translated domain of the domains through the warping operation, wherein the warping operation applies the identical synthetic optical flow to each of the original frame and the translated frame, such that the identical synthetic optical flow pseudo-supervises the implementation of the unsupervised losses by providing a consistent basis for the simulation of synthetic adjacent frames across the domains.

2. The computer-implemented method of claim 1, wherein receiving data associated with the source video and the target video includes receiving image data associated with a real-world driving scene video of a driving scene of a vehicle and receiving image data associated with a simulated driving scene video of a simulated driving scene.

3. The computer-implemented method of claim 2, wherein processing image-to-image translation across the domains includes determining a key frame of a plurality of frames for each of the real-world driving scene video and the simulated driving scene video, wherein the key frame for each of the real-world driving scene video and the simulated driving scene video is a middle frame of the plurality of frames utilized to produce synthetic adjacent frames.

4. The computer-implemented method of claim 3, wherein a perceptual loss is provided wherein a pair of images before and after the image-to-image translation includes a same content.

5. The computer-implemented method of claim 3, wherein processing image-to-image translation across the domains includes implementing an unsupervised recycle loss in which a movement in a domain that is associated with the source video is consistent with a movement in a domain that is associated with the target video.

6. The computer-implemented method of claim 5, wherein processing image-to-image translation across the domains includes implementing an unsupervised spatial loss in which a movement in the domain that is associated with the source video causes a similar amount of corresponding movement in the domain that is associated with the target video.

7. The computer-implemented method of claim 6, wherein processing the synthesized temporally consistent video includes combining loss functions of the unsupervised recycle loss and the unsupervised spatial loss to optimize a single-frame of each of the source video and the target video.

8. The computer-implemented method of claim 1, wherein training the neural network with data includes updating synthesized video data associated with the synthesized temporally consistent video to a machine learning dataset, wherein the machine learning dataset includes at least one field that is associated with various synthesized scenes of various domains.

9. A system for learning temporally consistent video synthesis using fake optical flow comprising:
 a memory storing instructions when executed by a processor cause the processor to:
  receive data associated with a source video and a target video;
  process image-to-image translation across domains of the source video and the target video, wherein unsupervised losses are implemented to construct bidirectional unsupervised temporal regularization to facilitate the image-to-image translation;
  process a synthesized temporally consistent video based on the image-to-image translation; and
  train a neural network with data that is based on synthesizing of the source video and the target video, wherein
 processing image-to-image translation across the domains and processing the synthesized temporally consistent video includes:
 determining a plurality of frames for each of the source video and the target video, and determining a source video key frame of the plurality of frames of the source video and a target video key frame of the plurality of frames of the target video with the source video key frame being a middle frame of the plurality of frames of the source video and the target video key frame being a middle frame of the plurality of frames of the target video; and
 implementing an identical synthetic optical flow as a warping operation including using an original frame of at least one of the plurality of frames of the source video and the plurality of frames of the target video, and a translated frame, associated with the original frame, of at least one of the plurality of frames of the source video and the plurality of frames of the target video to simulate synthetic adjacent frames for each of the original frame in an original domain of the domains and the translated frame in a translated domain of the domains through the warping operation, wherein the warping operation applies the identical synthetic optical flow to each of the original frame and the translated frame, such that the identical synthetic optical flow pseudo-supervises the implementation of the unsupervised losses by providing a consistent basis for the simulation of synthetic adjacent frames across the domains.

10. The system of claim 9, wherein receiving data associated with the source video and the target video includes receiving image data associated with a real-world driving scene video of a driving scene of a vehicle and receiving image data associated with a simulated driving scene video of a simulated driving scene.

11. The system of claim 10, wherein processing image-to-image translation across the domains includes determining a key frame of a plurality of frames for each of the real-world driving scene video and the simulated driving scene video, wherein the key frame for each of the real-world driving scene video and the simulated driving scene video is a middle frame of the plurality of frames utilized to produce synthetic adjacent frames.

12. The system of claim 11, wherein a perceptual loss is provided wherein a pair of images before and after the image-to-image translation includes a same content.

13. The system of claim 11, wherein processing image-to-image translation across the domains includes implementing an unsupervised recycle loss in which a movement in a domain that is associated with the source video is consistent with a movement in a domain that is associated with the target video.

14. The system of claim 13, wherein processing image-to-image translation across the domains includes implementing an unsupervised spatial loss in which a movement in the domain that is associated with the source video causes a similar amount of corresponding movement in the domain that is associated with the target video.

15. The system of claim 14, wherein processing the synthesized temporally consistent video includes combining loss functions of the unsupervised recycle loss and the unsupervised spatial loss to optimize a single-frame of each of the source video and the target video.

16. The system of claim 10, wherein the processor is further configured to:
communicate with the neural network to instruct a simulator, which generates the simulated driving scene, to execute a plurality of driving scene simulations to provide various simulated driving scene videos to train the neural network on driving scene states not previously trained to the neural network.

17. The system of claim 9, wherein training the neural network with data includes updating synthesized video data associated with the synthesized temporally consistent video to a machine learning dataset, wherein the machine learning dataset includes at least one field that is associated with various synthesized scenes of various domains.

18. A non-transitory computer readable storage medium storing instruction that when executed by a computer, which includes a processor perform a method, the method comprising:
receiving data associated with a source video and a target video;
processing image-to-image translation across domains of the source video and the target video, wherein unsupervised losses are implemented to construct bidirectional unsupervised temporal regularization to facilitate the image-to-image translation;
processing a synthesized temporally consistent video based on the image-to-image translation; and
training a neural network with data that is based on synthesizing of the source video and the target video, wherein
processing image-to-image translation across the domains and processing the synthesized temporally consistent video includes:
determining a plurality of frames for each of the source video and the target video, and determining a source video key frame of the plurality of frames of the source video and a target video key frame of the plurality of frames of the target video with the source video key frame being a middle frame of the plurality of frames of the source video and the target video key frame being a middle frame of the plurality of frames of the target video; and
implementing an identical synthetic optical flow as a warping operation including using an original frame of at least one of the plurality of frames of the source video and the plurality of frames of the target video, and a translated frame, associated with the original frame, of at least one of the plurality of frames of the source video and the plurality of frames of the target video to simulate synthetic adjacent frames for each of the original frame in an original domain of the domains and the translated frame in a translated domain of the domains through the warping operation, wherein the warping operation applies the identical synthetic optical flow to each of the original frame and the translated frame, such that the identical synthetic optical flow pseudo-supervises the implementation of the unsupervised losses by providing a consistent basis for the simulation of synthetic adjacent frames across the domains, and
training the neural network with data includes updating synthesized video data associated with the synthesized temporally consistent video to a machine learning dataset, wherein the machine learning dataset includes at least one field that is associated with various synthesized scenes of various domains.

* * * * *